United States Patent [19]

Chow et al.

[11] Patent Number: 4,641,724
[45] Date of Patent: Feb. 10, 1987

[54] FRACTURE DETECTION USING CIRCUMFERENTIAL OFFSET ACOUSTIC PATHS

[75] Inventors: Edward Y. Chow, Danbury; Robert L. Kleinberg, Ridgefield, both of Conn.

[73] Assignee: Schlumberger Technology Corporation, New York, N.Y.

[21] Appl. No.: 511,415

[22] Filed: Jul. 6, 1983

[30] Foreign Application Priority Data

Jul. 30, 1982 [GB] United Kingdom ................ 8222033

[51] Int. Cl.$^4$ .......................... G01V 1/40; G01V 1/00; E21B 49/00
[52] U.S. Cl. .................................... 181;104; 367/28; 73/152
[58] Field of Search ............... 181/102, 104, 105, 111, 181/112; 367/25, 28, 30, 75, 86, 88, 911; 73/152

[56] References Cited

U.S. PATENT DOCUMENTS

| | | | |
|---|---|---|---|
| 2,943,694 | 7/1960 | Goodman | 367/25 |
| 3,289,156 | 11/1966 | Wilson | 340/18 |
| 3,406,776 | 10/1968 | Henry | 367/75 |
| 3,585,580 | 6/1971 | Vogel | 367/29 |
| 3,683,326 | 8/1972 | White | 367/25 |
| 3,775,739 | 11/1973 | Vogel | 367/75 |
| 3,786,894 | 1/1974 | Lebreton | 181/5 BE |
| 3,794,976 | 2/1974 | Mickler | 367/75 |
| 3,949,352 | 4/1976 | Vogel | 367/31 |
| 4,130,816 | 12/1978 | Vogel et al. | 367/35 |
| 4,283,953 | 8/1981 | Plona | 367/86 X |
| 4,293,934 | 10/1981 | Herolz et al. | 367/27 |
| 4,439,497 | 3/1984 | DiFoggio | 367/155 |

FOREIGN PATENT DOCUMENTS 1141245 12/1962 Fed. Rep. of Germany .
1116406 of 0000 United Kingdom .

OTHER PUBLICATIONS

Douze & Laster, Statistics of Semblance, 44(12) Geophysics 1999 (1979).
Koerperich, *Investigation of Acoustic Boundary Waves and Interference Patterns as Techniques for Detecting Fractures*, 30 J. Pet. Tech. 1199 (1978).
Koerperich, *Evaluation of the Circumferential Microsonic Log-A Fracture Detection Device*, SPWLA Sixteenth Annual Logging Symposium, Jun. 4–7 (1975).
Suau & Gartner, *Fracture Detection from Well Logs*, 21(2) The Log Analyst 3 1980.
Hirsch, Cisar, Glass & Romanowski, *Recent Experience with Wireline Fracture Detection Logs*, SPE Paper 10333 (1981).
Setser, *Fracture Detection by Circumferential Propagation of Acoustic Energy*, SPE Paper 10204 (1981).
Roever, Vining & Strick, *Propagation of Elastic Wave Motion from an Impulsive Source Along a Fluid/Solid Interface*, A251 Phil. Trans. Roy. Soc. London 455 (1959).
In re Vogel, 166 USPQ 144 (Bd. of Appeals 1970).

Primary Examiner—Charles T. Jordan
Assistant Examiner—Brian S. Steinberger
Attorney, Agent, or Firm—Stephen L. Borst; David G. Coker; David H. Carroll

[57] ABSTRACT

In the apparatus and method of the invention, acoustic energy is propagated in two slightly differing, or offset, circumferential paths in such a way as to interact with the formation under investigation. The propagating energy is detected and the resulting waveforms are compared using semblance. The waveforms corresponding to the respective paths will be quite similar provided that the length of the paths are equal and that there are no fractures or other similar anomalies between the source and receiver. The waveforms for the respective paths will be quite dissimilar, however, if a fracture or similar anomaly does lie between the source and receiver for the respective paths. The semblance may be displayed in log format.

11 Claims, 20 Drawing Figures

| MEASUREMENT CYCLE | SOURCES | | | | RECEIVERS | | | | NOTES |
|---|---|---|---|---|---|---|---|---|---|
| | 0°(−) | 0°(+) | 180°(−) | 180°(+) | 90°(−) | 90°(+) | 270°(−) | 270°(+) | |
| 1 | X | | | | $S_1$ | | $S_2$ | | DIGITIZE AND STORE $S_1, S_2$ |
| 2 | | X | | | | $S_3$ | | $S_4$ | DIGITIZE & STORE $S_3, S_4$ OAP SETS $S_1, S_3$ & $S_2, S_4$ COMPLETE |
| 3 | | | X | | $S_5$ | | $S_6$ | | DIGITIZE AND STORE $S_5, S_6$ |
| 4 | | | | X | | $S_7$ | | $S_8$ | DIGITIZE & STORE $S_7, S_8$ OAP SETS $S_5, S_7$ & $S_6, S_8$ COMPLETE |

(STEPS)

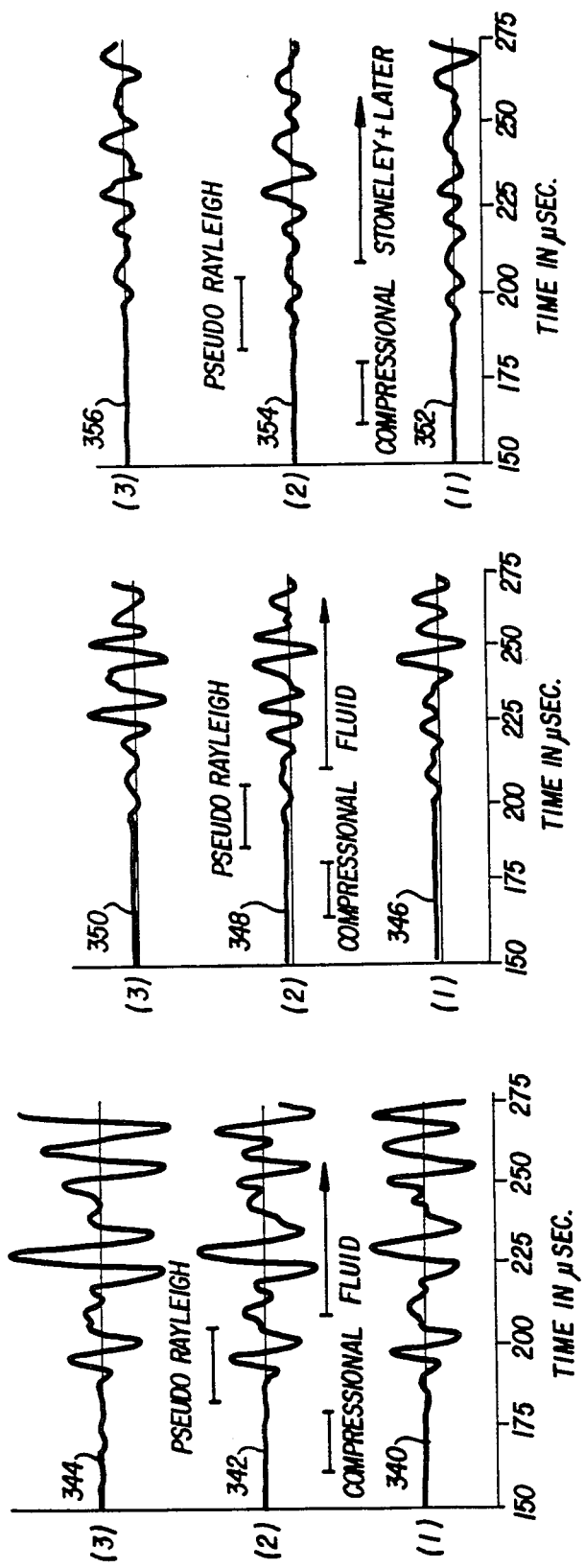

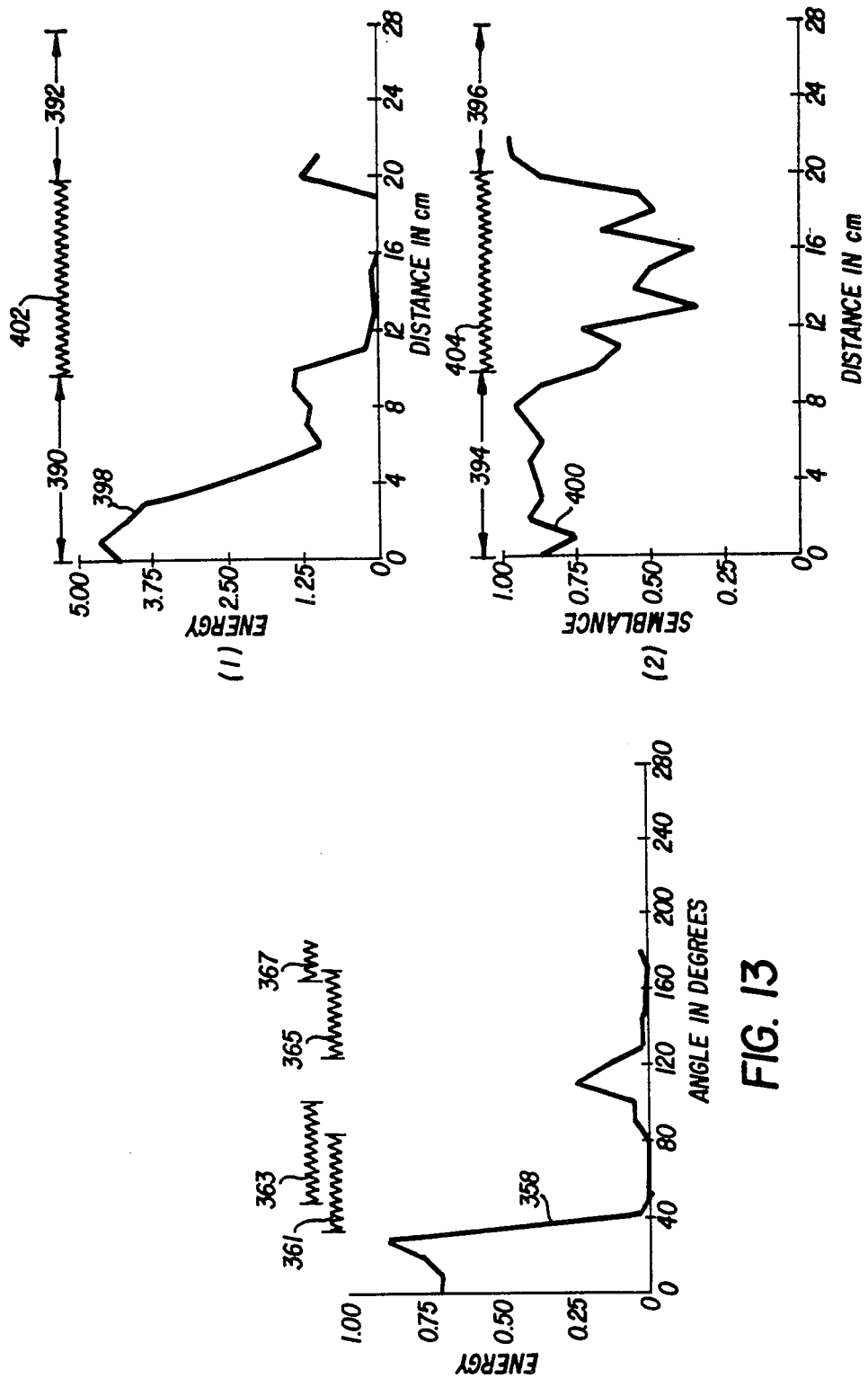

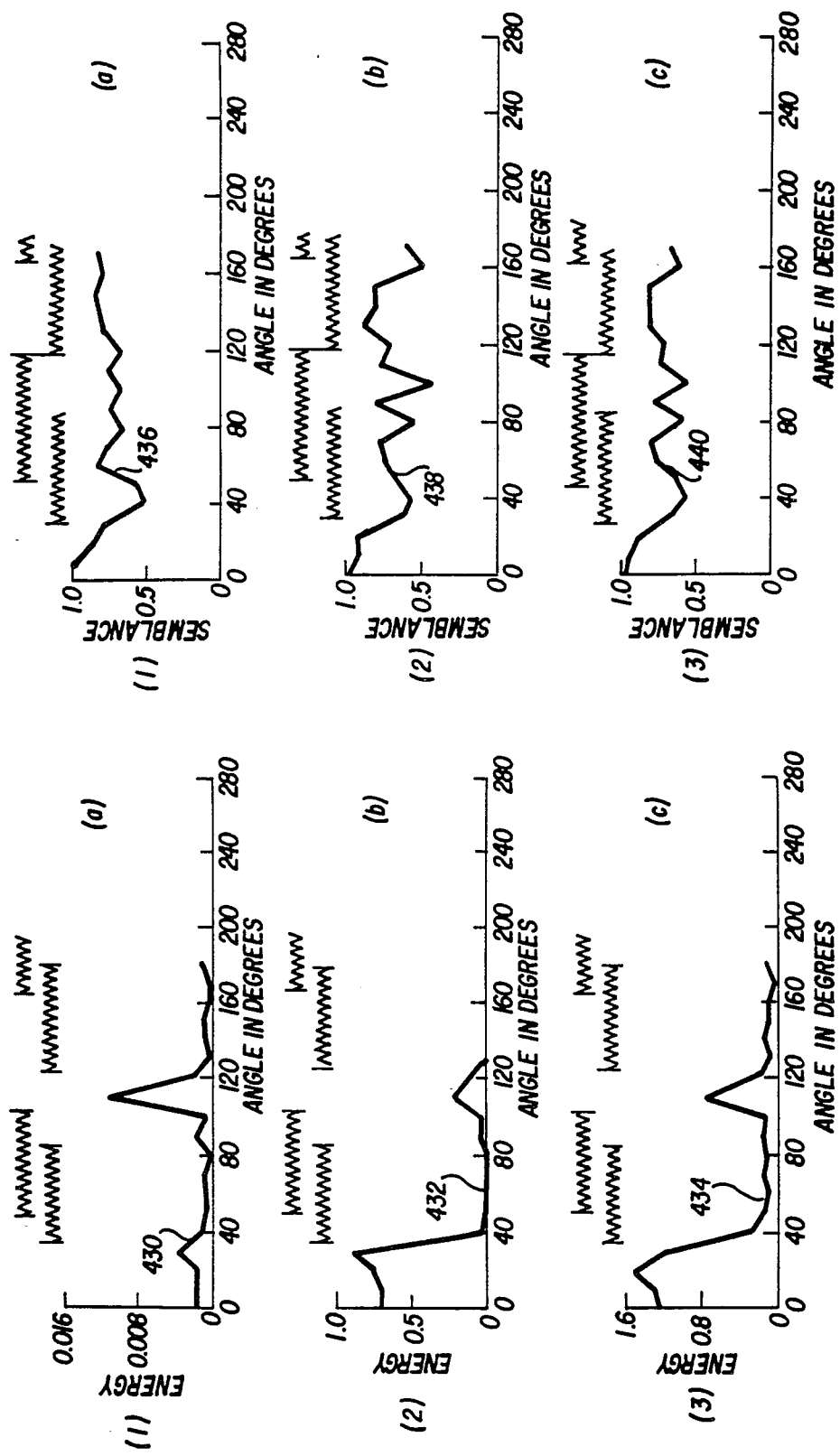

FRACTURE DETECTION USING CIRCUMFERENTIAL OFFSET ACOUSTIC PATHS

BACKGROUND OF THE INVENTION

The present invention relates to a method and apparatus for acoustic logging; and more particularly, to a method and apparatus using propagating ultrasonic energy to detect the presence of fractures and anomalies in an earth formation surrounding a borehole.

Surface-breaking fractures and other anomalies occurring at the wall of a borehole traversing an earth formation are of interest since many reservoirs produce hydrocarbons through fractured formations. Vertical fractures are of greatest interest to the industry, since horizontal fractures tend to be closed by overburden and hence do not facilitate production. The wall of a borehole is a remote and particularly hostile environment in which to detect fractures, however, and the success of known devices and techniques has been variable.

One known method is based on an amplitude reduction of acoustic waves traveling longitudinally between the transmitter and receiver of an axially oriented array. Compressional or shear waves cannot effectively be used in this method. Theoretically, boundary waves—those waves traveling along the borehole wall with characteristics that depend on the interaction of the wall and borehole fluid—are responsive to vertical fractures. In practice, however, boundary waves do not respond to fractures under certain conditions of interest. See Koerperich, *Investigation of Acoustic Boundary Waves and Interference Patterns as Techniques for Detecting Fractures*, 30 J. Pet. Tech. 1199 (1978).

Another known method is based on interference patterns of reflected or mode converted energy that originate from acoustic discontinuities such as fractures or bed boundaries, and travel longitudinally in the borehole. As the tool approaches and moves away from the discontinuity, the pattern becomes visible as a "w" or "v" shape on specific types of displays if a mode conversion occurs. See U.K. Pat. No. 1,116,406 (Shell International Research, Matschappij N. V., published June 6, 1968). Interference patterns generally do not originate at fractures which are nearly vertical, however. See Koerperich, supra.

A method for detecting vertical fractures which has received great attention is the use of an energy reduction technique based on circumferentially traveling shear waves which in vertically fractured zones normally intersect the fracture plane. An early technique is disclosed in U.S. Pat. No. 2,943,694 (Goodman, July 5, 1960). The Goodman apparatus engages the wall of the borehole, and acoustic energy is applied to a first wall location. The acoustical coupling is achieved by direct contact. Acoustic energy propagates to a second wall location where it is received by a transducer that is insensitive to longitudinal wave energy; hence, the signal which is detected at the second location is representative substantially only of shear wave energy. Cracks or fissures in the earth formations that are interposed in the shear wave transmission path reduce the amplitude of the signal obtained at the receiving transducer, relative to the signal amplitude obtained with an intervening solid formation. According to Goodman, discrimination against compressional waves may be improved by arranging the spacing and operating frequency so that the compressional and shear waves are displaced and phased by 90° and by employing phase selection thereto.

A variation of the Goodman approach involves projecting narrow-beam acoustic energy into the formation at such an angle of incidence that shear wave energy is maximized while compressional wave energy is minimized. See U.S. Pat. No. 3,406,776 (Henry, Oct. 22, 1968); U.S. Pat. No. 3,585,580 (Vogel, June 15, 1971); U.S. Pat. No. 3,949,352 (Vogel, Apr. 6, 1976). The narrow beam approaches were not altogether successful. Because of variations in the shear speeds of formations of interest, the critical angle of incidence for the shear wave is variable and energy could be coupled into other wave types. Moreover, the energy reduction technique is unreliable. Acoustic energy employed in narrow-beam systems should be well above 100 kHz, i.e. 500 kHz or higher, in order to form a narrow-beam with a transducer of realistic size. At these frequencies scattering from even slight surface roughness will give large attenuation of the signal and mimic a fracture response. As a result, such a narrow-beam tool would be unduly sensitive to even slight changes in borehole conditions.

U.S. Pat. No. 3,794,976 (Mickler, Feb. 26, 1974) discloses a system and method for separating the compressional arrivals and the shear arrivals based on the use of an extremely short burst of acoustic energy (i.e. highly-dampened acoustic energy). The Mickler approach was not entirely successful in practice, possibly due to weaknesses in the energy reduction technique on which it relied.

Techniques for determining formation characteristics from both compressional and shear wave energy have been developed. For example, U.S. Pat. No. 3,775,739 (Vogel, Nov. 27, 1973) discloses the use of separate transducer sets, one oriented to produce substantially compressional waves in the formation and the other oriented to produce substantially shear waves in the formation. The presence of a vertical fracture is indicated by a reduction in the amplitude of the received shear wave without a corresponding reduction in the amplitude of the compressional wave. Acoustic energy is propagated in overlapping intervals so that the entire circumference of the borehole is surveyed.

A technique for determining formation characteristics from shear and other energy types is disclosed in U.S. Pat. No. 4,293,934 (Herolz et al, Oct. 6, 1981). See also U.S. Pat. No. 4,130,816 (Vogel et al. Dec. 19, 1978). The transmitters of the apparatus radiate compressional wave acoustic energy of an omnidirectional character in the azimuthal direction into the well fluid filling the borehole. Appreciable energy is radiated in the direction of the various critical angles of refraction. According to Herolz, the first arrival is a small amplitude compressional rock wave which contributes negligibly to the amplitude of the received signal. The next arriving wave is a refracted formation shear wave. The third wave to arrive is a compressional wave that travels directly through the borehole fluid to the receiver (a direct fluid wave). The fourth wave type is a compressional "guided fluid" wave. Transmission of the compressional "guided fluid" wave and the shear wave are impaired by an open fracture, although the guided fluid wave exhibits a high degree of attenuation when traveling along the wall past a fluid filled fracture only if the fracture is of sufficient width to cause leakage of the wave pressure into the open fracture. While the shear wave may be separately recorded and processed to the complete exclusion of later arriving waves, the guided fluid wave received after the shear wave may be separately recorded and processed with the shear.

While a number of studies indicate that a very careful analysis of sonic logs produced by such prior art techniques can be useful in locating fractures (see, e.g., Koerperich, *Evaluation of the Circumferential Microsonic Log-A Fracture Detection Device*, SPWLA Sixteenth Annual Logging Symposium, June 4–7 (1975); Suau & Gartner, *Fracture Detection from Well Logs*, 21(2) The Log Analyst 3 (1980)), at least one other study indicates that difficulty in interpreting these logs can be expected under certain circumstances (see, e.g., Hirsch, Cisar, Glass & Romanowski, *Recent Experience with Wireline Fracture Detection Logs*, SPE Paper 10333 (1981)).

SUMMARY OF THE INVENTION

Accordingly, it is an object of the present invention to overcome, by use of novel methods and apparatus, the difficulties of conventional logging systems for acoustically detecting vertical fractures.

Another object of the present invention is to provide a logging method and apparatus for detecting vertical fractures and other such borehole anomalies which is not necessarily dependent on the excitation of only a particular type of acoustic wave.

A further object of the present invention is to achieve more reliable detection of fractures generally and also under unfavorable borehole conditions such as rugosity, varying lithology, and varying borehole size and shape.

Yet another object of the present invention is to achieve detection of vertical fractures about the full circumference of a borehole, without blind spots.

These and other objects of the present invention are achieved in a novel logging method and apparatus for measuring vertical fractures and other such borehole anomalies in an earth formation by using a technique based on the range dependence of fracture response. Simply stated, acoustic energy is propagated in two slightly differing, or offset, circumferential paths in such a way as to interact with the formation under investigation. The propagating energy is detected and the resulting waveforms are compared. The waveforms corresponding to the respective paths will be quite similar provided that the length of the paths are equal and that there are no fractures or other similar anomalies between the source and receiver. The waveforms for the respective paths will be quite dissimilar, however, if a fracture or similar anomaly does lie between the source and receiver for the respective paths.

A apparatus in accordance with the present invention comprises a sonde body; a first transducer pair including a first acoustic source for applying acoustic energy to the formation and a first acoustic receiver for detecting acoustic energy arising from circumferentially traveling acoustic energy, said first source and first receiver being separated by a distance; a second transducer pair including a second acoustic source for applying acoustic energy to the formation and a second acoustic receiver for detecting acoustic energy arising from circumferentially traveling acoustic energy, said second source and second receiver being separated by a distance equal to the distance separating said first source and said first receiver; means for maintaining said first and second transducer pairs substantially in a plane transverse to the axis of said sonde body, and the respective sources and the respective receivers of said first and second transducer pairs at a predetermined offset; and means for comparing respective waveforms produced by said first and second receivers.

Other objects, features and characteristics of the invention will be apparent upon perusal of the following detailed description and claims, with reference to the accompanying drawings, all of which are part of this specification.

BRIEF DESCRIPTION OF THE DRAWINGS

In the drawings, wherein like reference characters indicate like parts:

FIG. 5 illustrates one possible arrangement of pads in the borehole, in accordance with the present invention, and shows an exemplary set of offset circumferential acoustic paths;

FIGS. 10–20 are graphs representing information obtained in various experiments to investigate characteristics of the present invention.

DETAILED DESCRIPTION OF THE INVENTION

Figure 1:
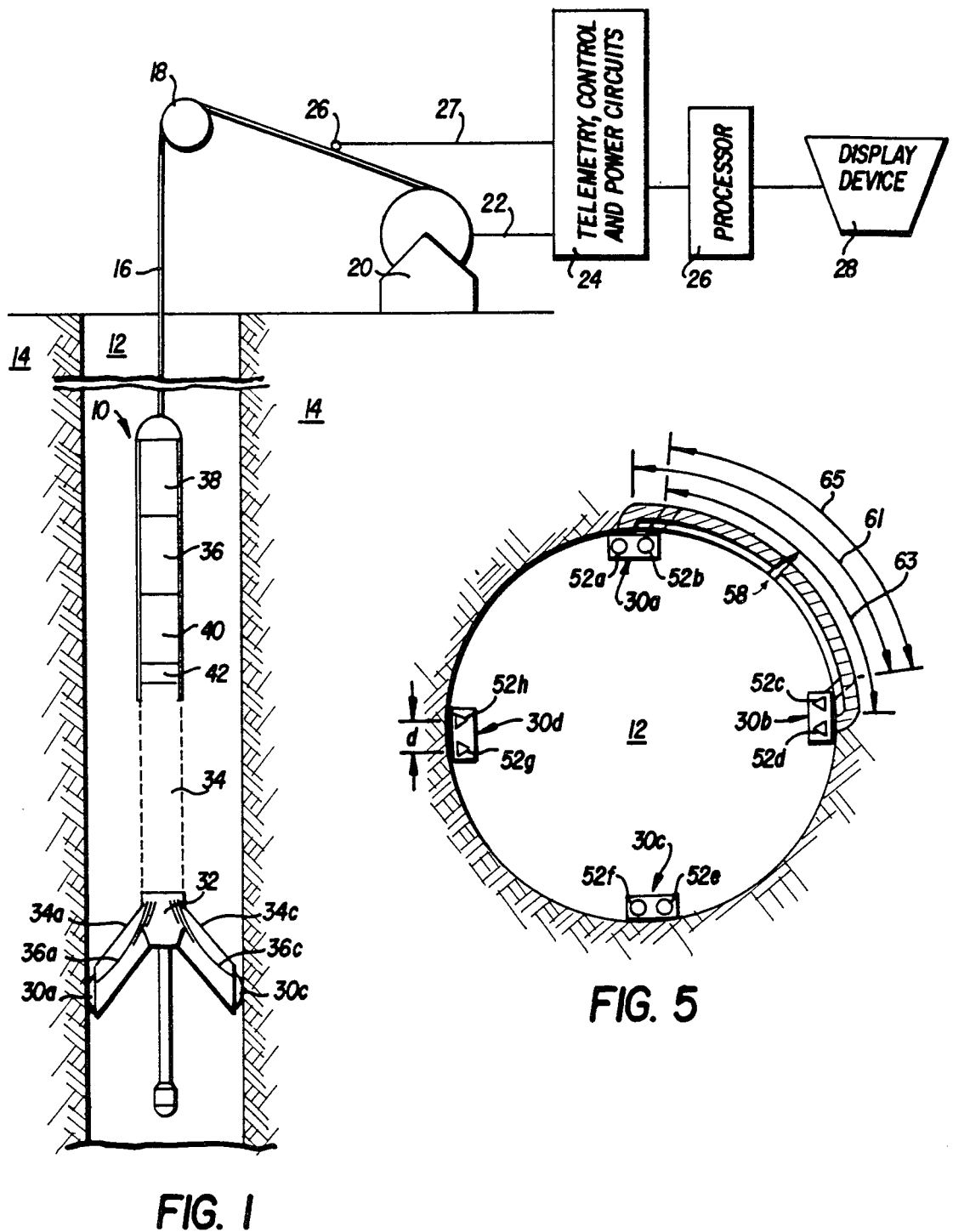
FIG. 1 illustrates a borehole logging system according to the present invention, the logging tool being shown in plan view and the uphole equipment being shown schematically.

An understanding of the various embodiments of the present invention may be facilitated by a detailed description of the theory and generalized implementation thereof.

The insonification of a material results in the propagation of several types of waves. In a fluid filled borehole, for example, the several wave types which have been noted are the compressional wave, the critically refracted shear wave, the surface pseudo-Rayleigh wave, the Stoneley, and various fluid waves. See, e.g., G. G. Setser, *Fracture Detection by Circumferential Propagation of Acoustic Energy*, SPE Paper 10204 (1981); W. L. Roever, T. F. Vining, and E. Strick, *Propagation of Elastic Wave Motion from an Impulsive Source Along a Fluid/Solid Interface*, A251 Phil. Trans. Roy. Soc. London 455 (1959). The critically refracted compressional wave is the smallest in amplitude, but has the highest velocity of all wave types. The critically refracted shear wave and the surface pseudo-Rayleigh wave have similar velocities. The pseudo-Rayleigh wave is often greater in amplitude than either the compressional or the shear wave and therefore is readily detectable. The Stoneley wave travels at a speed near to that of sound in the borehole fluid and is of substantial amplitude. The amplitude and/or phase of the compression, shear, pseudo-Rayleigh and Stoneley arrivals are affected by fractures and other similar surface anomalies. The fluid wave that travels along the straight line between the transmitter and receiver is not affected by the properties of the formation under investigation.

The present invention derives from the range dependence of fracture response. The waveform of an acoustic signal is the summation in time of the various responses of its components. In an unfractured homogeneous medium, the waveform of an acoustic signal propagating circumferentially does not depend on the individual locations of the source and receiver, provided that the distance between them is constant. This property does not hold if a fracture lies between the source and receiver. Upon a small displacement of the source and receiver relative to the fracture in a homogeneous medium, the respective waveforms before and after displacement differ substantially. A number of mechanisms contribute to this observed range dependency, including mode conversion at the fracture, the non-exponential decay of waves traveling through the material neighboring the fracture, the scattering of body waves at interior crack surfaces, and non-linear scattering effects, among others. These factors contribute to varying degrees, depending on the circumstances.

The mechanism by which mode conversion causes signals propagated along offset acoustic paths to differ may be illustrated by a simplified example that focusses on two critically refracted waves, a compressional wave and a slower shear wave. In the absence of a fracture, the interval between the first arrival of substantially compressional energy and the first arrival of substantially shear energy will be proportional to the distance between the source and the receiver, and the difference of the inverse velocities (i.e. slownesses). At a fracture interface some compressional energy will be converted to shear energy, and some shear energy will be converted to compressional energy. The first arrivals of these converted signals will not arrive at the receiver coincident with the unconverted components of the signal, thereby giving rise to interference effects. The time over which the interference effects are present depends on the location of the fracture relative to the source-receiver pair. If the source is close to the fracture, the shear-to-compressional converted signal will arrive closely following the unconverted compressional arrival. The greater the source-fracture distance, the longer the interval of undisturbed compressional signal. In the presence of several interfacial waves being propagated simultaneously, the interference affects can be quite complicated and the compared waveforms can differ substantially from one another, especially if they are not purely sinusodial.

Non-exponential decay also plays a role in the range dependence of fracture response. A fracture may be considered a secondary source, the strength of which is given by the amplitude of the wave incident upon it multiplied by a scattering factor, which may be a function of frequency. The received signal will be proportional to the source strength reduced by any losses that occur between the scattering center and the receiver. This can be expressed as $$R(r_1, r_2) = P(r_2) \cdot f \cdot P(r_1) \cdot T \quad (1)$$

where R is the received signal, P(r) is the propagation loss over a distance r in the homogeneous medium, f is the scattering function, and T is the source signal. In expression (1), $r_1$ is the distance from the source to the fracture, and $r_2$ is the distance from the fracture to the receiver. Translating the source-receiver pair together results in a new source-fracture distance $r_3$ and a new fracture-receiver distance $r_4$. In general, $R(r_1, r_2)$ does not equal $R(r_3, r_4)$ even though $r_1 + r_2$ equals $r_3 + r_4$. The received signals will be identical only if the propagation losses are exponential with distance, i.e. only if P(r) is proportional to $\exp(-r/r_o)$. Although many loss mechanisms such as material attenuation do produce exponential decays, others do not. The latter include geometrical spreading and radiation losses in circumferential propagation, the latter being a sum of exponentials.

Non-linear scattering effects from a fracture will produce range dependence in the presence of any loss in the surrounding medium. The scattering of body waves from interior fracture surfaces also contributes. Undoubtedly, other mechanisms, some of which may be specific to certain circumstances, can contribute to the breakdown of translational invariance of the received signal. It can be difficult, and is operatively unnecessary to the present invention, to unambiguously identify which mechanisms are operative in any given situation.

According to the Offset Acoustic Path (OAP) technique of the present invention, acoustic energy is propagated in two slightly differing, i.e. offset, circumferential paths in such a way as to interact with a material under investigation. The propagating energy is detected and the resulting waveforms are compared. The waveforms corresponding to the respective paths will be quite similar provided that the length of the paths are equal and that there are no fractures or other similar anomalies between the source and receiver. The waveforms for the respective paths will be quite dissimilar, however, if a fracture or similar anomaly does lie between the source and receiver for the respective paths. The two received waveforms are compared using an average semblance technique, which is derived from the semblance (also known as coherence) that is well known in the literature (see, e.g., Douze & Laster, *Statistics of Semblance*, 44(12) Geophysics 1999 (1979)). Let $[x_1(1), x_1(2), \ldots]$ and $[x_2(1), x_2(2), \ldots]$ denote corresponding samples of the two waveforms. The semblance $\rho(n)$ is defined as the energy of the average of the waveforms divided by the average of their energies. For a section of the waveforms centered at sample "n", $$\rho(n) = \frac{\sum_{k=-m}^{m} \frac{1}{4}[x_1(n+k) + x_2(n+k)]^2}{\sum_{k=-m}^{m} \frac{1}{2}[x_1^2(n+k) + x_2^2(n+k)]} \quad (2)$$

where $2m+1$ is the number of samples in the window.

The semblance $\rho(n)$ can be related to the correlation c(n) between $x_1$ and $x_2$ by $$\rho(n) = \frac{q}{1+q^2} c(n) + \frac{1}{2} \quad (3)$$

where q is the ratio of the rms amplitudes:

$$q = \left[ \frac{\sum_{k=-m}^{m} x_1^2(n+k)}{\sum_{k=-m}^{m} x_2^2(n+k)} \right]^{\frac{1}{2}} \quad (4)$$

The correlation itself can be thought of as the vector dot product (inner product) of the normalized waveforms, or $$c(n) = \frac{\sum_{k=-m}^{m} x_1(n+k)x_2(n+k)}{\left[\sum_{k=-m}^{m} x_1^2(n+k)\right]^{\frac{1}{2}} \left[\sum_{k=-m}^{m} x_2^2(n+k)\right]^{\frac{1}{2}}} \quad (5)$$

Accordingly, c(n) measures the phase between the two waveforms and it will be appreciated that $\rho(n)$ has amplitude and phase contributions. $\rho(n)$ is unity if the waveforms are identical, equal to one-half if they are uncorrelated, and zero if they are negatives of each other. A bias in one of the waveforms will mimic a lack of correlation. For this reason it is important to subtract out any dc shift from the measured signals.

In practice it is preferable to calculate the semblance for short overlapping sections of the waveforms; the result is referred to as the "sliding window semblance" and is displayed as a plot of semblance versus the time of the center of the window. The sliding window technique preferably is used in the present invention, because the sonic waveforms contain various arrivals of differing amplitudes and $\rho(n)$ computed for a window containing large and small arrivals will put undue emphasis on the large amplitude portions of the signal. The sliding window technique allows all relevant acoustic components, including the compressional, to be used on an equal footing.

It should be noted that the window should not be made too short. Such a window makes the semblance susceptible to high frequency noise in the waveform, which would be averaged out by a longer window. An appropriate window length is one-half to two times the prevailing period of the waveform. A 10 μs window has been used in the present invention, which satisfies the criterion for the borehole embodiment described below.

An average over the $\rho(n)$ of short sliding windows will not scale the contributions of the different arrivals according to their size. An appropriate average is $$S(n_1, n_2) = \frac{1}{n_2 - n_1 + 1} \sum_{n=n_1}^{n_2} \rho(n) \quad (6)$$

The quantity $S(n_1,n_2)$ is the measure used for comparison of waveforms for the OAP technique. The averaging interval $(n_1,n_2)$ is chosen to include those components of the signal sensitive to fractures.

A pad-type borehole logging sonde suitable for the detection of fractures in formations by the OAP technique is illustrated in FIG. 1. The sonde, indicated generally at 10, is disposed in a borehole 12 through earth formation 14. The borehole 12 is filled with a suitable drilling mud. The end of the sonde 10 nearest the surface is connected by means of an armored multi-conductor cable 16 to suitable apparatus at the surface of the earth for raising and lowering the sonde 10 through the borehole 12. The multi-conductor cable 16 passes over a sheave 18 to a suitable drum and winch mechanism 20. Electrical connection between the various conductors of the multi-conductor cable 16 and telemetry, control and power circuits 24 at the surface of the earth is accomplished by means of cable 22 and a suitable multi-element slip ring and brush contact assembly integral with the drum and winch mechanism 20. Cable depth information is provided by measurement wheel 26 and supplied via cable 27 to the telemetry, control and power circuits 24. Signals from sonde 10 containing information on a characteristic of formation 14 are supplied to processor 26 from the telemetry, control and power circuits 24. A log of the formation characteristic versus depth is produced by processor 26 and furnished to a display device 28 for viewing by a user.

The sonde 10 comprises a plurality of sections or cartridges. Arm section 32 includes the arm mechanism necessary to support a plurality of pads 30. The sonde 10 preferably includes 4 or 6 pads; the FIG. 1 embodiment illustrates a four pad embodiment and only shows two diametrically opposite pads 30a and 30c in the interest of clarity. The pads 30 are suitably maintained in contact with the wall of borehole 12 by means of a system comprising, with respect to pad 30a for example, arm apparatus 34a and leaf springs 36a. The arm apparatus 34a is actuated by another section of the sonde 10, the arm hydraulic power system 34. Downhole electronics for the sonde 10 are included in cartridge 36. The telemetry system for transmitting signals to and from sonde 10 is included in cartridge 38. An accelerometer and magnetometer section 40 may be included for determining the azimuth and inclination of the sonde 10 where such measurements are desired. Telemetry section 38, electronics section 36, and accelerometer and magnetometer section 40 are separated from the arm hydraulic power system 34 and arm section 32 by a bulkhead 42.

Figure 2:
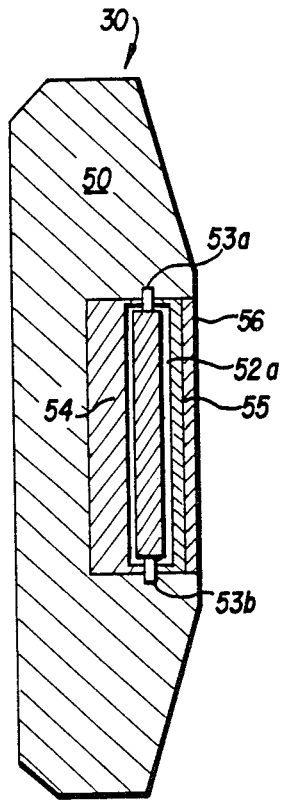
FIGS. 2–4 illustrate a representative pad for practicing the present invention, FIG. 2 being a longitudinal cross-sectional view, FIG. 3 being a frontal plan view, and FIG. 4 being a transversal cross-sectional view.
Figure 3:
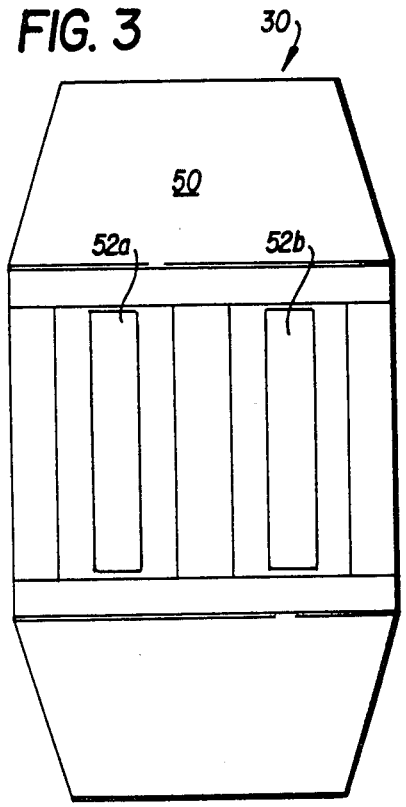
Figure 4:
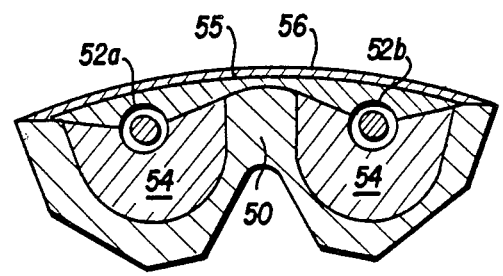

A representative pad 30 is illustrated in detail in FIGS. 2-4, which show respectively longitudinal, frontal, and transversal views. The body 50 of the pad 30 is machined from a suitable material such as, for example, stainless steel. The surface of the pad body 50 which faces the wall of borehole 12 is contoured to match generally the contour of the formation at the borehole and may be tapered for ease of movement through the borehole. Two longitudinal (relative to the nominal direction of travel of the pad) generally semicylindrical depressions are provided in the pad body 50 to receive respective acoustic transducers 52a and 52b, and the central portion of the pad 30 is depressed to accept a protective sheet 56 which covers the acoustic transducers 52a and 52b. The arrangement of the acoustic transducers 52a and 52b within the pad body 50 is evident in the pad frontal view of FIG. 3, in which the protective sheet 56 and the elastomeric molding 55 are omitted for clarity.

Each of transducers 52a and 52b comprises a generally cylindrical element of a suitable material such as PZT-4 (Trademark), a modified lead zirconate titanate ceramic available from Vernitron Limited (England). A similar material is available from Keranos Incorporated (United States). The interior space of transducer 52a is filled with an elastomeric molding substance. Transducer 52a is rigidly maintained within its respective semicylindrical depression machined in the pad body 50 by pins 53a and 53b which engage respective holes suitably provided in the pad body 50 and in the elastomeric molding within the interior of the transducer. The elastomeric molding 54 provided behind each transducer 52a and 52b within the respective cylindrical depressions of pad body 50 is of a highly attenuating type which forms a baffle about the back portion of each transducer 52a and 52b, for a purpose to be explained below. The elastomeric molding 55 on the face of each transducer and the protective sheet 56 are relatively acoustically transparent and form an acoustic window.

Although it has been found that the maximum sensitivity of the OAP technique is attained with a six pad configuration having transducers spaced at 60° intervals, borehole mechanical design considerations favor a four pad configuration having transducers spaced at 90° intervals. A four-pad arrangement is shown in FIG. 1 and illustrated schematically in FIG. 5. As shown in FIG. 5, pads 30a and 30c are provided with two sources each, sources 52a and 52b and sources 52e and 52f respectively. Pads 30b and 30d are provided with two receivers each, receivers 52c and 52d and receivers 52g and 52h respectively. The center-to-center spacings of the respective transducers on each pad are all equal and of distance "d." This insures that the respective offset paths 61 and 63 (illustrative) are of equal length. The lengths of paths 61 and 63 depend on borehole size, which nominally measures five or eight inches in diameter. While all the pad-to-pad distances need not be the same for the OAP technique, the pad-to-pad distances should be equalized to the fullest extent practical in view of a companion method, the energy reduction method (to be described below), which may be influenced by variations from sector to sector and from depth to depth.

The offset acoustic paths 61 and 63 shown in FIG. 5 are exemplary. Assuming that transducer source 52a insonifies the formation 14 at a time $t_1$, acoustic wave energy can be traced along roughly a path 61 to receiver 52c. Path 61 is illustrated in FIG. 5 as a right-to-left crosshatch. Assuming source transducer 52b insonifies formation 14 with acoustic energy at a later time $t_2$, acoustic wave energy can be traced along roughly a path 63 to receiver 52d. Path 63 is shown in left-to-right crosshatch. The respective acoustic paths 61 and 63, which are offset from one another by the distance d, overlap over path 65 which passes through radial fracture 58. Although the acoustic paths 61, 63 and 65 are shown passing through formation 14, it will be understood as explained above that this wave energy comprises a plurality of wave types, i.e. compressional, shear, pseudo-Rayleigh, and Stoneley, which have different propagation characteristics. Nonetheless, in accordance with the present invention it is not critical to distinguish between these various wave types.

Figure 6:
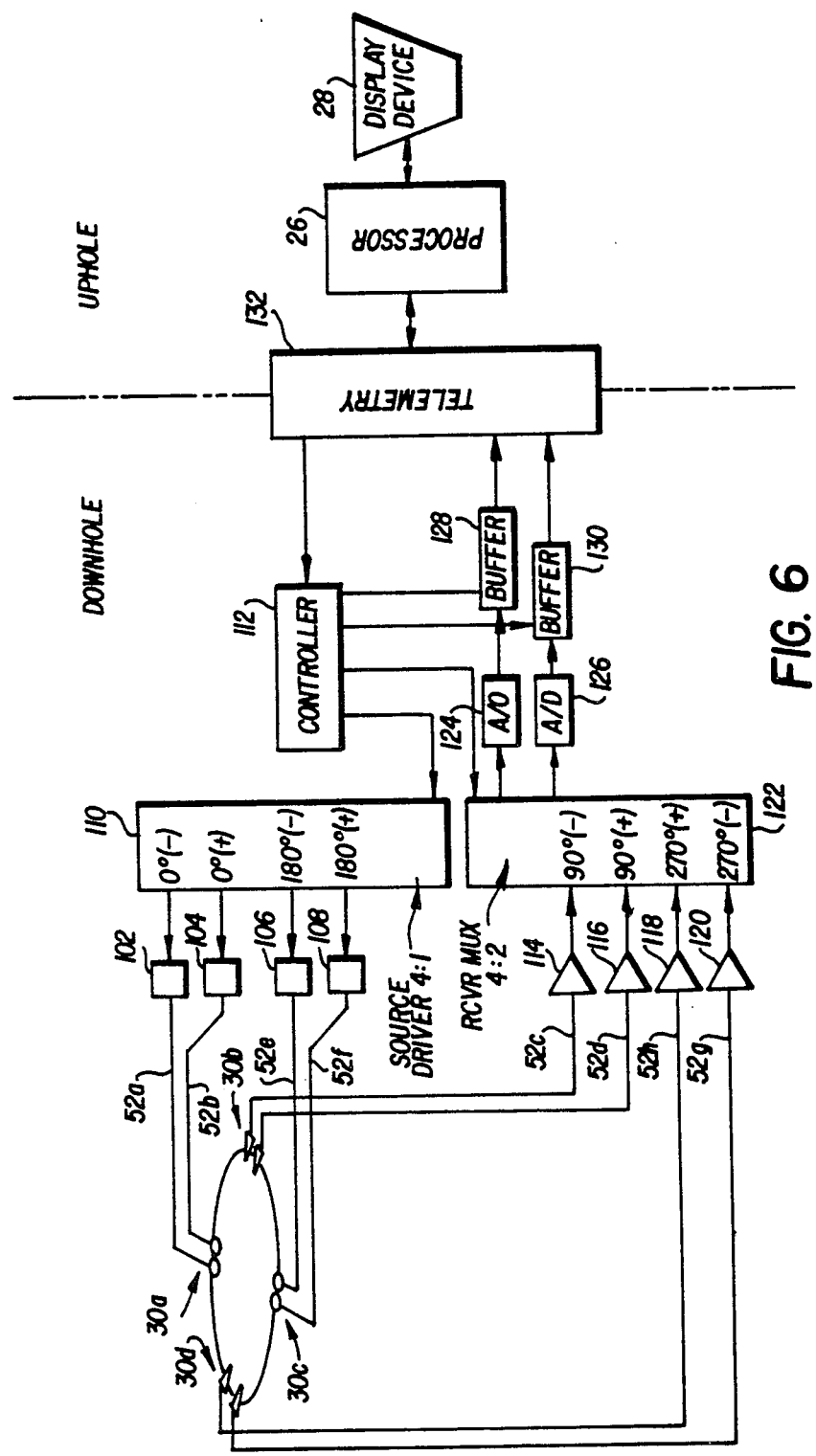
FIG. 6 schematically illustrates one possible electronic circuit for operating the various source and receiving transducers, in accordance with the present invention.
Figures 7, 8:
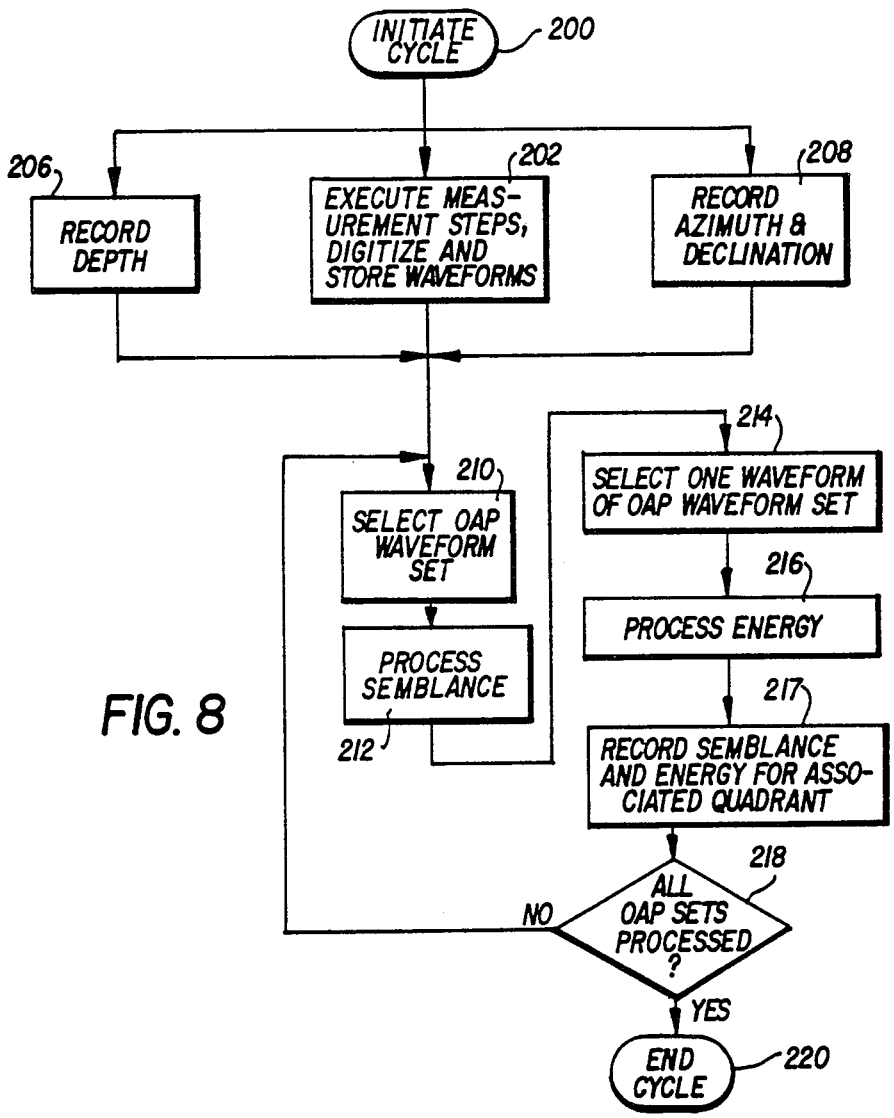
FIG. 7 is a table pertaining to a typical measurement cycle according to the present invention.
FIG. 8 is a flow diagram illustrating the various steps of a typical measurement cycle, in accordance with the present invention.

The electronic circuit for operating the source and receiving transducers of pads 30a, 30b, 30c and 30d is shown in FIG. 6. Transducers 52 preferably are broadband and omnidirectional with a center frequency preferably above 100 kHz but less than the frequency at which grain scattering becomes a problem. Preferably, although not necessarily, the source transducers 52a, 52b, 52e and 52f are energized so as to produce a short burst of acoustic energy of approximately 10 μs duration. In order to enhance interference effects non-sinusodial signals should be propagated. The acoustic pulse may be specifically pulse-shaped to propagate non-sinusodial signals, by means well known in the art. Accordingly, the source transducers 52a, 52b, 52e and 52f are coupled to respective suitable broadband excitation circuits 102, 104, 106, and 108. The source transducers 52a, 52b, 52e and 52f are excited in a preselected sequence as shown in the Table of FIG. 7. The source driver 110 activates a selected one of the excitation circuits 102, 104, 106 and 108 in accordance with signals from controller 112. The firing rate of the four source transducers 52a, 52b, 52e and 52f is selected to be sufficiently low to insure that the acoustic energy generated in the borehole 12 and formation 14 will be fully decayed before the next source transducer is energized, without allowing undue longitudinal movement of the tool 10 between measurements of the offset acoustic paths of a set. A firing rate of 1000 Hz is sufficient for this purpose.

At a preselected time following the excitation of a source transducer, the waveforms produced by selected receivers are processed for further analysis. For this purpose, receivers 52c, 52d, 52g and 52h are coupled to respective broadband preamplifiers 114, 116, 118 and 120. Appropriate outputs of the preamplifiers 114, 116, 118 and 120 are selected by receiver multiplexer 122 under control of controller 112. Two of the waveforms are selected by receiver multiplexer 122 and supplied to respective analog/digital converters 124 and 126 along respective channels. The outputs of the analog/digital converters 124 and 126 are copied into respective buffers 128 and 130 for storage prior to transmission uphole.

Uphole transmission is handled by telemetry system 132, which is a schematic representation for downhole telemetry system 38 and telemetry, control and power circuits 24. Such telemetry systems are well known in the art.

Processor 26 is situated uphole to issue commands to controller 112 through telemetry system 132 and to receive digitized waveforms from the respective receivers 52c, 52d, 52g and 52h. Suitable computers are well known in the art. The received waveforms are processed and results displayed at device 28 for interpretation. Alternatively, a microprocessor (not shown) may be located downhole in electronics cartridge 36 to receive and process the digitized waveforms. Downhole processing is preferable when the full waveforms are not required for study.

The operation of the system comprising sonde 10 and the surface equipment is illustrated in FIG. 8. A measurement cycle is initiated at step 200. This measurement cycle comprises a number of essentially concurrently executed steps which are illustrated at 202, 206 and 208. Specifically, at step 202, the measurement steps are executed and the waveforms are digitized and stored, in accordance with FIG. 7. The firing sequence and the receiving sequence is given in the Table of FIG. 7, with reference to FIG. 5. The first step in a given measurement cycle is to fire the source 52a which resides at position 0° (−). Receiver 52c residing at 90° (−) and receiver 52g residing at 270° (−) then are enabled to receive acoustic energy over a desired period of time. This period may be initiated by detection of first motion or after a selected delay, to eliminate feedthrough of the excitation pulse to the receiver circuitry. A delay of 25 μs should be sufficient. The period should be terminated after sufficient energy has been received to permit effective processing of the waveforms. A time of 200 μs following first motion should be sufficient, although this value is not critical. Acoustic wave energy passing the receiving transducers 52c and 52g is converted to respective signals $s_1$ and $s_2$, which are digitized and stored. Essentially concurrently with step 202, the depth of the tool is recorded at step 206 and, if desired, the azimuth and inclination of the tool are recorded at step 208. The cycle continues with the subsequent steps set forth in the Table of FIG. 7.

One completed OAP waveform set is selected at step 210. The OAP sets are $s_1$ and $s_3$, $s_2$ and $s_4$, $s_5$ and $s_7$, and $s_6$ and $s_8$ which are available as set forth in FIG. 7. At step 212, the OAP waveform set is processed in accordance with the semblance technique described above. At step 214, one of the waveforms of the selected OAP waveform set is selected and is processed by an energy reduction method at step 216. Semblance and energy are recorded as a function of depth for the borehole quadrant corresponding to the selected OAP waveform set at step 217.

Steps 214 and 216 are not part of the OAP technique but may be advantageously combined with the OAP technique. The energy reduction method, which in its general form is well known, is based on the phenomenon that waves propagating across fractures suffer a diminution of energy. The semblance method, on the other hand, is sensitive to both phase and amplitude as can be seen from expressions (3), (4), and (5). The different sensitivities of the respective methods has been found to be useful in improving the reliability of fracture detection under certain circumstances, as explained below.

At step 218, a check is made as to whether all available OAP waveform sets have been processed. If not, control is returned to step 210 for the selection of another OAP waveform set and steps 212, 214, 216 and 218 are executed as set forth above.

Experimental Results

Compressional, pseudo-Rayleigh and fluid arrivals all show identifiable and different fracture responses. The amplitude and/or phase of each arrival is affected by the fractures. In all of these results, the use of a high frequency, broadband source waveform permits a unique identification of the arrivals which is desirable from an experimental perspective but unnecessary in the practice of the present invention.

Figure 9:
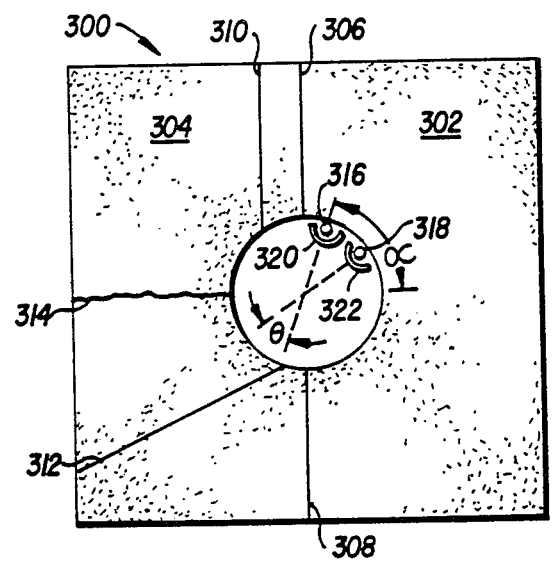
FIG. 9 illustrates the geometry of an experimental block used in investigating characteristics of the present invention.

It is helpful to consider the results of certain experiments to facilitate an understanding of the present invention. The majority of the measurements were made in an Indiana limestone formation of 16% porosity. The geometry of the experimental block 300 is shown in FIG. 9. The formation has an 8″ diameter smooth borehole and can be separated into two sections, block 302 and block 304, along vertical sawcuts 306 and 308. The sawcuts 306 and 308, which intersect the center of the artifical borehole along a diameter, act as smooth radial fractures. The two non-radial sawcuts labeled 310 and 312 extend vertically only halfway through block 304. A radially intersecting vertical fracture 314 is also shown in FIG. 9. The entire formation was submerged in a tank of water. Measurements were made with blocks 302 and 304 connected to form a complete formation traversed by a borehole.

The bulk slownesses in the limestone were measured as 66 μsec/ft for the compressional wave, 117 μsec/ft for the shear wave, and 125 μsec/ft for the planar pseudo-Rayleigh wave. The density of the saturated limestone was 2.5 gm/cc and the fluid speed was measured as 203 μsec/ft.

The characteristics of the source and receiver transducers 316 and 318 respectively were selected to achieve waveforms which have clearly indentifiable arrivals. Having clearly identifiable arrivals was deemed desirable for this experiment but is not necessary in practice. A pulse of a few cycles and hence broadbanded in frequency, with a center frequency of about 100 kHz, was selected. Suitable hydrophones include Type 8100 and Type 8103, manufactured by Bruel & Kjaer Instruments, Inc. Each transducer 316 and 318 was cylindrical in design and radiated nearly omnidirectionally in the horizontal plane. Each of the transducers 316 and 318 was capable of acting as either a source or receiver.

To suppress direct water arrivals, baffles 320 and 322 were placed around the transducers 316 and 318 respectively to generate a directional radiation pattern. Baffles having the characteristics either of reflectors or of attenuators would have been suitable. The baffles 320 and 322 in these experiments were made of styrofoam. Because of their low acoustic impedance due to air entrapment, the baffles 320 and 322 responded as reflectors rather than attenuators. If identification of arrivals is desired, care should be exercised in pad construction to preserve as short a time pulse as possible.

The instrumentation used to excite the transducers and amplify and digitize the received waveforms was standard laboratory equipment. The leading edge of a 100 volt, 1 msec rectangular excitation pulse was used.

The measurements typically involved moving the source 316 and receiver 318 around the borehole, the angle $\theta$ between them being kept constant. The angle $\theta$ was set at either 45, 60, or 90 degrees and the angular increments were either 3, 5, or 10 degrees. The transducers were adjusted in height such that in a complete rotation about the borehole, they would cross either three or five vertical fractures as desired. The three basic fractures included the two sawcuts 306 and 308 and the fracture 314. The extra two fractures were the non-radial sawcuts 310 and 312 in FIG. 5.

One set of experiments verified the findings of previous investigators that pseudo-Rayleigh waves are severely attenuated in crossing sawcuts or fractures in a formation. These experiments also verified that the amplitude of the compressional wave is not significantly affected by the presence of sawcuts or fractures. The experiments also established that the Stoneley wave responds to sawcuts and fractures much as the pseudo-Rayleigh wave responds.

The results of these experiments is shown in FIGS. 10, 11 and 12. Three waveforms are shown in FIG. 10: waveform 340 of FIG. 10(1) was measured at $\alpha=55°$, waveform 342 of FIG. 10(2) at $\alpha=60°$ and waveform 344 of FIG. 10(3) at $\alpha=65°$. The various arrivals are indicated, including a well isolated compressional signal. Note the extreme likeness of the compressional and pseudo-Rayleigh signal; the fluid arrivals show more variability. The effects of the sawcut 306 are shown in FIG. 11. Waveform 346 of FIG. 11(1) was measured at $\alpha=105°$, waveform 348 of FIG. 11(2) at $\alpha=110°$, and waveform 350 of FIG. 11(3) at $\alpha=115°$. Based on amplitude decrease with respect to the unfractured case, the pseudo-Rayleigh gives a clean indication of a fracture; the fluid arrivals give an adequate indication; and the compressional gives little indication. When the likeness of the three fractured signals is considered, however, there is evidence of variation (thus fracture information) in all three types of arrivals. The effects of the fracture 314 are shown in FIG. 12. Waveform 352 of FIG. 12(1) was measured at $\alpha=195°$, waveform 354 of FIG. 12(2) at $\alpha=200°$, and waveform 356 of FIG. 12(3) at $\alpha=205°$. Significant amplitude reduction will be observed in both the pseudo-Rayleigh and fluid arrivals as well as important variations in likeness in all of the arrivals.

The usefulness of the prior art energy reduction method is demonstrated by FIG. 13, which shows the energy diminution in waves propagating across fractures in log format. Energy in the compressional and pseudo-Rayleigh arrivals was calculated and plotted against transducer location, with the transducers 316 and 318 located $\theta = 60°$ apart. Wavy lines 361, 363, 365 and 367 over the plot 358 mark the sectors in which a fracture is between source 316 and receiver 318. The distinction between fractured and unfractured zones is quite clear. Note that in certain zones there are two fractures between the transducers; there is an additional reduction in energy compared to one-fracture zones, but the difference is very small compared to the energy in unfractured sectors.

The energy calculation emphasizes large amplitude arrivals. The compressional wave, which does not suffer much loss in passing over a fracture, is of relatively small amplitude and therefore does not greatly influence fracture detection. Both the pseudo-Rayleigh wave and the early-arriving fluid wave are strongly influenced by fractures in the present experiments and have the largest amplitudes of any received arrivals.

Figure 14:
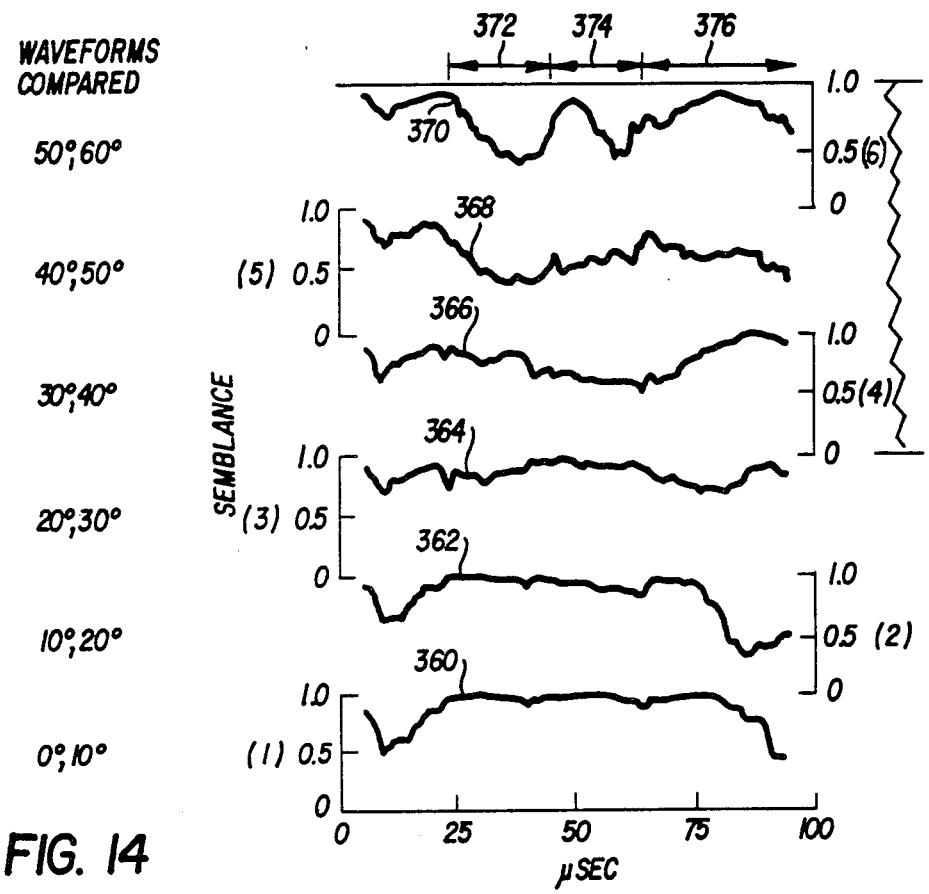

Other experiments were performed to investigate the sensitivity of the novel OAP technique to fractures. In one test simulating a borehole situation, the source 316 and receiver 318 were articulated at $\theta = 60°$ and translated around an 8 inch borehole in 10° steps. FIG. 14 shows typical data from this test. Each curve is a plot of the semblance in corresponding 10 μs windows of two successive 130 kHz center frequency waveforms, plotted against the time of the center of the windows. The lowest curve 360 is a comparison of waveforms taken at the 0° and 10° positions, the second curve 362 a comparison of waveforms taken at the 10° and 20° positions, and so on. Since this experiment was designed to excite separate arrivals, the intervals corresponding to compressional, pseudo-Rayleigh, and fluid arrivals were identifiable by examination of the waveforms and are marked in FIG. 14 as intervals 372, 374, and 376 respectively. Both compressional and pseudo-Rayleigh arrivals show semblance near unity in the unfractured zone (between 0° and 30°, FIGS. 14(1), 14(2) and 14(3) respectively), and substantially lower semblance in the fractured sector (30° to 60°, FIGS. 14(4), 14(5) and 14(6) respectively). The first part of the fluid arrivals also displays this sensitivity to fractures.

Figure 15:
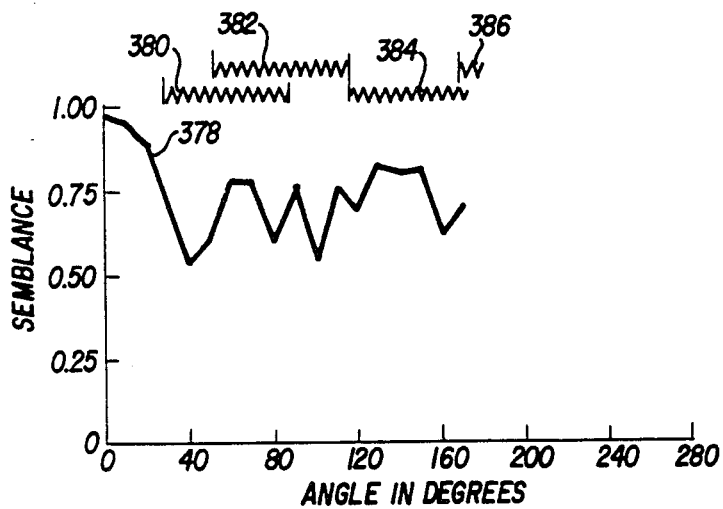

When the semblance in the compressional and pseudo-Rayleigh intervals is averaged, FIG. 15 is obtained. In FIG. 15, the semblance is plotted against the location of the transducer pair. The contrast between fracture and no-fracture response is good. In some sectors two fractures lie in the sonic path.

Other experiments were performed to investigate certain sensitivity issues material to the OAP technique. One such issue is the effect of lithology. The OAP technique was found to be less sensitive to lithology changes such as, for example, changing porosity, than the energy reduction method. A refraction experiment performed on a planar interface verified this. Blocks of green slate and limestone were placed side-by-side and a pair of transducers, spaced 10 cm apart, were translated together in 1 cm steps along the rock-water interface. The energy and semblance were then computed as described above. The results are shown at 398 in FIG. 16(1) and 400 in FIG. 16(2). Regions in which the sound travelled on the interface of a single block are indicated at 390 and 392 in FIG. 16(1) and at 394 and 396 in FIG. 16(2), the single block being green slate for intervals 390 and 394 and limestone for intervals 392 and 396. In the middle regions 402 (FIG. 16(1)) and 404 (FIG. 16(2)), which extend from 10 cm to 20 cm, the fracture-like boundary between the two blocks was in the path of sound propagation; both semblance and energy are low as expected. In the absence of a fracture the semblance 400 appears to be relatively insensitive to rock properties while the energy 398 is seen to vary radically within the slate 390.

Another issue investigated was the suitability of the technique in distinguishing between surface scratches and fractures that penetrate a significant distance into the formation. Cuts were made, to successively greater depths, in the concave (borehole) surface of the limestone block used in the propagation experiments. The cuts were normal to the surface and approximately 1 mm wide. Transducers, whose center frequency was 50 kHz, defined an acoustic path of 50° of arc. The semblance was found to be sensitive to the depth of the cut. Pseudo-Rayleigh and Stoneley waves retain high semblance for cuts no more than 1 cm deep. The compressional wave appears to be affected by shallower cuts. This is possibly due to tighter confinement of compressional wave energy to the surface.

Figure 17:
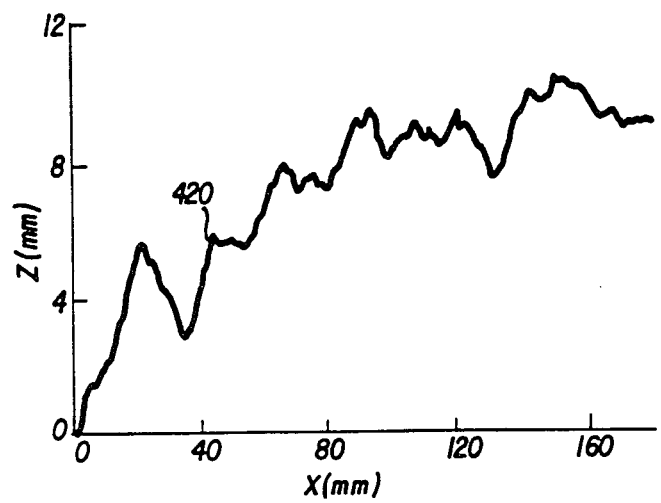

Yet another issue investigated was the effect of a rough surface. In a preliminary assessment of this effect, the fractured limestone block 304 was opened up so that the mating surfaces of the fracture formed a rough planar interface; the boundary between the blocks in this altered configuration was the saw-cut "back side" of the limestone block 304. Transducers, maintained at a spacing of 10 cm, were translated along the rough interface in steps of 1 cm. The profile of the surface along the line upon which the transducers were translated was measured using dial indicators. Measurements were made every 0.5 mm along the 175 mm long face of one of the matching block surfaces. The profile 420 is shown in FIG. 17. The peak-to-peak variation is a few millimeters, which represents a surface considerably rougher than would be expected in the competent rock formations in which fractures are of most interest.

Figure 18:
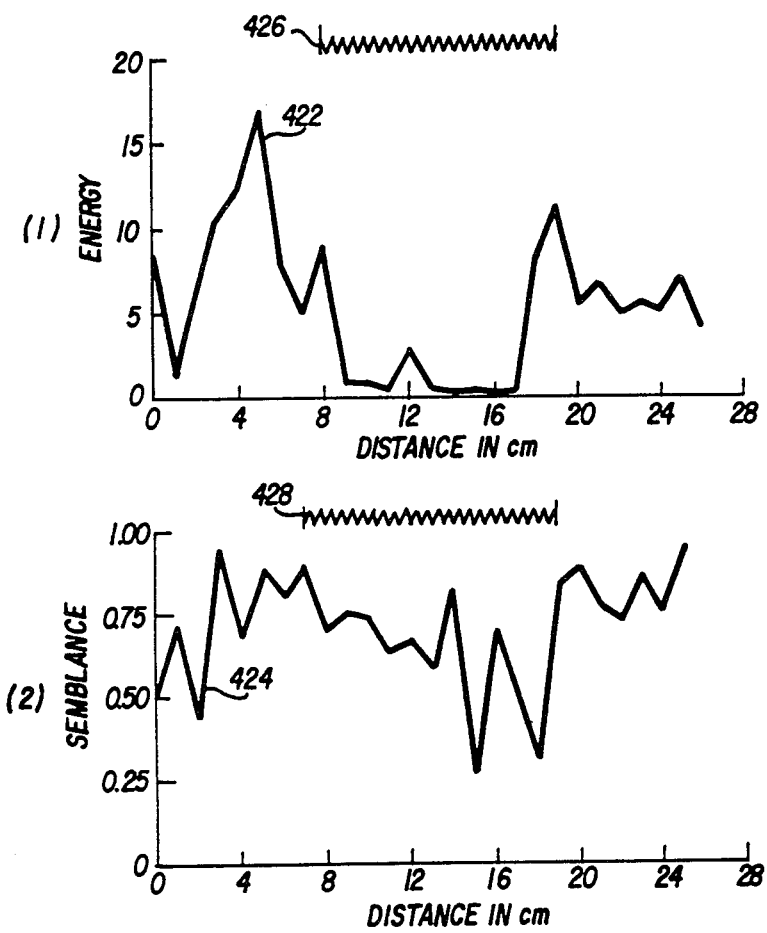

The results of both energy and semblance measurements are shown in FIG. 18 at 422 and 424 respectively. The intervals 426 and 428 over which a fracture response would be anticipated is denoted by wavy lines above the graphs 18(1) and 18(2) respectively. The OAP technique is marginally useful in detecting a fracture in the presence of a surface that is this rough, while the energy reduction method does reasonably well. The dramatic dip in both energy and semblance responses near x=2 cm is due to the large bump that appears on the surface near that position.

Advantageously, the energy reduction method may be used in conjunction with the OAP technique to improve the detectability of fractures in the presence of very rough surfaces where accuracy of the OAP technique is variable. Moreover, the OAP technique may be improved by applying known spatial averaging techniques.

Transducer arrangements suitable for the OAP technique reduce susceptibility to blind spots. A fracture lying beneath one of the transducers on a pad will intercept waves travelling to or from the other transducer on the pad, resulting in low semblance and energy, and hence detection of the fracture.

The effect of non-radial fractures was investigated. Both the OAP technique and energy reduction method responded equally to fractures intersecting the borehole at acute, right, and obtuse angles with respect to the direction of sound propagation. This tends to simplify fracture detection.

The effect of variable fracture closure was investigated. Core studies show that the width of fractures intersecting boreholes can range from 0.01 mm to 2 mm. The experiments spanned this range of closures. Experiments were performed with the blocks held tightly together with steel bands, then repeated with the bands cut. The fluid filled fractures were varied from the press fit to a width of several millimeters with no deleterious effect on the detection of fractures, either by the energy reduction method or the OAP technique.

The effect of mudcake and standoff on the energy measurement was investigated. Standoff up to 2 cm does not invalidate the energy measurement, but any standoff causes the contrast between fracture and nofracture response to be degraded. This is because less energy is being usefully coupled into the formation. A potentially more important deficiency of the energy measure is its variation due to varying stand-off, as decreases may be incorrectly interpreted as having been caused by a fracture.

The response of the OAP technique should not be adversely influenced by mudcake, even where the mudcake varies, provided the mudcake under the two transducers of the pad is of uniform thickness. This is because the two offset paths are still very similar, independent of the degree of stand-off caused by the mudcake. In this case, the OAP technique should be more reliable than the energy method.

The effect of irregular borehole size was considered. For a device with fixed number of pads, boreholes of different sizes will give rise to acoustic paths of different lengths. This will cause the energy reduction measure to vary, but the OAP measure should be relatively immune to such variations in path length. This is because the OAP technique measures the similarity between sound waves travelling in two paths that are nearly identical, regardless of the borehole size or shape.

Design Considerations

Transducers

Because compressional and pseudo-Rayleigh surface waves travel at a variety of velocities in a variety of formations, they are most reliably launched by sources and detected by receivers which are omnidirectional in the plane transverse to the borehole axis. Cylindrical transducers are most suitable for this application. Their length, which typically is one to two inches, will govern the axial distance over which the formation response will be averaged.

The OAP technique requires that the characteristics of the transducer pairs be selected so that the semblance between signals travelling on slightly offset unfractured paths in a homogeneous medium be high (i.e., near unity). This criteria is satisfied if each source-receiver pair is matched to its corresponding source-receiver pair. It is not necessary that all pairs of transducers have common characteristics.

Baffles

Baffles that prevent line-of-sight propagation of sound through the borehole fluid are useful; otherwise the formation arrivals will be masked by the extraneous fluid signals. The baffles used in the experiments were cut from styrofoam blocks. These formed highly reflective cavities which increased transducer ringing. An absorptive cup, such as a conventional lead-epoxy baffle, may be used to minimize ringing.

Offset

The Offset Acoustic Path method compares sound signals transmitted over a pair of arcs that are displaced with respect to each other. It is reasonable to expect there to be a displacement that is optimal for fracture detection. If the offset is too small there will be little difference in the propagated signals even in the presence of a fracture; in the limit of no displacement the signals of course would be identical. If the offset is too large there is a greater chance that formation inhomogeneities will cause the waveforms to differ even in the absence of a fracture.

Experimentally it has been found that for a 90° propagation arc an offset of 10° provides better sensitivity to fractures than an offset of 5°. The reliability for 15° and 20° offsets is similar to that of the 10° offset; this is probably a reflection of the homogeneity of the limestone block used in the measurements.

Interval Length

As discussed above, the phase of all the arrivals (compressional, pseudo-Rayleigh, Stoneley, and fluid components of the sonic signal) and the amplitude of all but the compressional, can be sensitive to the presence of fractures. Therefore, processing each component of the waveform individually yields the maximum information possible.

FIG. 19 illustrates the effect of choosing various time intervals over which the energy is calculated. These intervals were selected by examination of the waveforms. FIG. 19(1) shows the energy 430 in the compressional arrival, 19(2) shows the energy 432 in the pseudo-Rayleigh arrival, and 19(3) shows combined energy 434 of the compressional, pseudo-Rayleigh, and some Stoneley. The compressional energy is not very sensitive to the presence of fractures, and its magnitude is quite small (note vertical scales). Comparison of FIGS. 19(2) and 19(3) suggests that the energy reduction measurement is quite tolerant of an imprecise setting of the interval of calculation.

The same waveforms were used to calculate the semblances 436, 438, and 440 shown in FIG. 20. All arrivals are good indicators of fractures. As the figure illustrates, any of a variety of averaging intervals produces good results. For example, the laboratory data is well served by detecting the "first motion" ($E_1$) of the compressional arrival, at time $t_o$, and setting the end of the interval, $t_f$, by calculating when the fluid waves would begin to arrive. $t_f$ is given approximately by $$t_f = \frac{D}{v_{St}} - \frac{D}{v_p} + t_o$$

where D is the arc length between the transducers, $v_p$ is the velocity of the compressional wave, and $v_{St}$ is the velocity of the Stoneley wave. The intervals of calculation used in the preparation of FIGS. 15 and 18 were determined using this approach, with good results.

While the invention has been described with reference to particular embodiments, it is to be appreciated that the embodiments are illustrative and that the invention is not intended to be limited to only the disclosed embodiments. Variations within the spirit and scope of the invention will occur to those skilled in the art. For example, although in the preferred embodiment the acoustic transducers 52a–52h lie within a single transverse plane, the offset of the respective transducers of a pad may include a longitudinal component either alone or in addition to the preferred circumferential component, provided that the acoustic paths associated therewith substantially overlap. The substantial overlap can be facilitated if the acoustic path width is large. Measurements also may be time shifted to effect the substantial overlap. These variations are limited insofar as the respective acoustic paths must be of essentially the same length and substantially overlap, i.e. that the semblance between them is high in an unfractured formation. Moreover, it will be understood that as used herein, the term circumferential is not limited to the azimuthal direction. Variation in these and other such features are contemplated and are within the scope of the present invention.

What is claimed is:

1. An apparatus for investigating an earth formation traversed by a borehole with circumferentially traveling acoustic energy, comprising:
   a sonde body;
   a first transducer pair including a first acoustic source for applying acoustic energy to the formation and a first acoustic receiver spaced from said first source by a distance, for detecting acoustic energy traveling circumferentially along a first path between said first source and said first receiver;
   a second transducer pair including a second acoustic source for applying acoustic energy to the formation and a second acoustic receiver spaced from said second source by a distance essentially equal to the distance between said first source and said first receiver, for detecting acoustic energy traveling circumferentially along a second path between said second source and said second receiver and of essentially the same length as said first path;
   means for maintaining said first and second transducer pairs substantially in a plane transverse to the axis of said sonde body, and the first transducer pair at a predetermined circumferential offset relative to the second transducer pair, whereby said first path overlaps said second path for a substantial portion thereof; and
   means for comparing respective waveforms produced by said first and second receivers.

2. An apparatus as in claim 1 further comprising means for determining the attenuation of circumferentially traveling acoustic energy detected by one of said first and second receivers.

3. An apparatus as in claim 1, wherein said comparing means comprises means for determining the semblance of said respective waveforms; said apparatus further comprising:
   means for determining attenuation of circumferentially traveling acoustic energy detected by at least one of said first and second receivers; and
   means for comparing said semblance and said attenuation to determine the presence of fracturing of the formation.

4. An apparatus as in claim 1, wherein said comparing means comprises means for determining the semblance of said respective waveforms to determine the presence of fracturing of the formation.

5. An apparatus as in claim 1 further comprising means for preventing interference of a fluid wave with the acoustic energy detected by said first and second receivers.

6. An apparatus as in claim 1 further comprising means for preventing generation of a fluid wave.

7. An apparatus as in claim 1 further comprising means for preventing propagation of a fluid wave.

8. An apparatus as in claim 1 further comprising:
   respective baffles mounted partially about said first and second sources for preventing generation of a fluid wave; and
   respective baffles mounted partially about said first and second receivers for preventing interference of a fluid wave with the acoustic energy detected by said first and second receivers.

9. An apparatus as in claim 1, wherein said maintaining means comprises:
   a first pad adapted for application to the wall of the borehole, said first pad including mounting means for fixedly engaging said first and second sources and maintaining said offset therebetween;
   an arm mechanism for applying said first pad to the wall of the borehole;
   a second pad adapted for application to the wall of the borehole, said second pad including mounting means for fixedly engaging said first and second receivers and maintaining said offset therebetween; and
   an arm mechanism for applying said second pad to the wall of the borehole.

10. An apparatus as in claim 1, wherein said first and second sources and said first and second receivers are omnidirectional.

11. A method for investigating an earth formation traversed by a borehole with circumferentially traveling acoustic energy, comprising the steps of:
   (a) effecting the travel of acoustic energy over a first circumferential path;
   (b) detecting acoustic energy arising from said effecting step (a);
   (c) effecting the travel of acoustic energy over a second circumferential path of essentially the same length as said first circumferential path and substantially overlapping said first path, and circumferentially offset therefrom by a predetermined distance;
   (d) detecting acoustic energy arising from said effecting step (c);
   (e) sampling the respective results of said detecting steps (b) and (d) to obtain respective waveform samples $[x_1(1), x_1(2), \ldots]$ and $[x_2(1), x_2(2), \ldots]$;
   (f) determining the semblance $\rho(n)$ for short sliding windows of the waveforms centered at sample n in accordance with the expression $$\rho(n) = \frac{\sum\limits_{k=-m}^{m} \frac{1}{2}[x_1(n+k) + x_2(n+k)]^2}{\sum\limits_{k=-m}^{m} \frac{1}{2}[x_1^2(n+k) + x_2^2(n+k)]}$$

where $2m+1$ is the number of samples in a selected window; and (g) averaging over said $\rho(n)$ of short sliding windows in accordance with the expression $$S(n_1 \cdot n_2) = \frac{1}{n_2 - n_1 + 1} \sum\limits_{n=n_1}^{n_2} \rho(n).$$

* * * * *